United States Patent [19]

Donaldson et al.

[11] Patent Number: 5,246,584
[45] Date of Patent: Sep. 21, 1993

[54] METHOD AND APPARATUS FOR DESTROYING ORGANIC CONTAMINANTS IN AQUEOUS LIQUIDS

[75] Inventors: Terrence L. Donaldson, Lenior City; James H. Wilson, Oak Ridge, both of Tenn.

[73] Assignee: Martin Marietta Energy Systems, Inc., Oak Ridge, Tenn.

[21] Appl. No.: 920,961

[22] Filed: Jul. 28, 1992

[51] Int. Cl.$^5$ ............................ C02F 1/20; C02F 3/02
[52] U.S. Cl. .................... 210/603; 210/621; 210/631; 210/180; 210/188; 210/195.1; 210/901; 210/916; 210/718; 435/262; 435/266
[58] Field of Search ............... 210/603, 620, 621, 622, 210/615, 616, 617, 631, 718, 747, 150, 188, 180, 195.1, 259, 170, 901, 916; 55/54, 84, 89, 198; 435/262, 264, 266

[56] References Cited

U.S. PATENT DOCUMENTS

| | | | |
|---|---|---|---|
| 2,200,581 | 5/1940 | Pruss | 210/916 |
| 2,867,945 | 1/1959 | Gotaas et al. | 435/42 |
| 3,335,082 | 8/1967 | Ullrich | 210/916 |
| 3,914,164 | 10/1975 | Clark | 204/149 |
| 4,066,538 | 1/1978 | Cines et al. | 210/631 |
| 4,127,447 | 11/1978 | Griffith et al. | 195/116 |
| 4,207,179 | 6/1980 | McCarthy et al. | 210/631 |
| 4,391,887 | 7/1983 | Baumgarten et al. | 435/42 |
| 4,401,569 | 9/1983 | Jhaveri et al. | 210/610 |
| 4,447,541 | 5/1984 | Peterson | 435/264 |
| 4,495,056 | 1/1985 | Venardos et al. | 210/631 |
| 4,511,657 | 4/1985 | Colaruotolo et al. | 435/253 |
| 4,535,061 | 8/1985 | Chakrabarty et al. | 435/253 |
| 4,664,805 | 5/1987 | Focht | 210/262 |
| 4,713,340 | 12/1987 | Crawford | 435/253 |
| 4,713,343 | 12/1987 | Wilson, Jr. et al. | 435/264 |
| 4,737,461 | 4/1988 | Sugisawa et al. | 435/200 |
| 4,803,166 | 2/1989 | Kulpa et al. | 435/253.3 |
| 4,804,629 | 2/1989 | Roy | 435/253.3 |
| 4,806,148 | 2/1989 | Ottengraf | 210/916 |
| 4,816,403 | 3/1989 | Roy | 435/253.3 |
| 4,833,086 | 5/1989 | Horowitz | 435/252.1 |
| 4,853,334 | 8/1989 | Vandenbergh et al. | 435/262 |
| 4,859,594 | 8/1989 | Portier | 435/172.1 |
| 4,877,736 | 10/1989 | Fliermans | 435/183 |
| 4,894,162 | 1/1990 | Cournoyer et al. | 210/916 |

OTHER PUBLICATIONS

Little, C. D. et al., Trichloroethylene Biodegradation by a Methane-Oxidizing Bacterium, Applied and Environmental Microbiology, vol. 54, No. 4, 951-956 (Apr. 1988).

Strandberg, G. W. et al., Degradation of Trichloroethylene and trans-1,2-Dichloroethylene by a Methanotrophic Consortium in a Fixed-Film, Packed-Bed Bioreactor, Environmental Science & Technology, vol. 23, 1422-1425 (Nov. 1989).

Hopper, David R., Cleaning Up Contaminated Waste Sites-Remediation's goal: "Protect human health and the Environment", Chemical Engineering, 94-110 (Aug. 1989).

Stover, E. L., Coproduced Ground Water Treatment and Disposal Options During Hydrocarbon Recovery Operations, Focus, GWMR, 75-82 (Winter 1989).

Thomsen, K. O. et al., Ground Water Remediation Using an Extraction, Treatment, and Recharge System Focus, GWMR, 92-99 (Winter 1989).

(List continued on next page.)

*Primary Examiner*—Christopher Upton
*Attorney, Agent, or Firm*—P. H. Smirman; H. W. Adams

[57] ABSTRACT

A method and apparatus for destroying organic contaminants, such as trichloroethylene, in aqueous liquids, such as groundwater, utilizing steam stripping integrated with biodegradation. The contaminated aqueous liquid is fed into a steam stripper causing the volatilization of essentially all of the organic contaminants and a portion of the aqueous liquid. The majority of the aqueous liquid is discharged from the steam stripper. The volatilized vapors are then condensed to the liquid phase and introduced into a bioreactor. The bioreactor contains methanotrophic microorganisms which convert the organic contaminants into mainly carbon dioxide. The effluent from the bioreactor is then recycled back to the steam stripper for further processing.

20 Claims, 2 Drawing Sheets

OTHER PUBLICATIONS

Flathman, P. E., et al., Remediation of Contaminated Ground Water Using Biological Techniqes, Focus, GWMR, 105–119 (Winter 1989).

Garland, S. B. et al., The Use of Methanotrophic Bacteria for the Treatment of Groundwater Contaminated with Trichloroethene at the U.S. Department of Energy Kansas City Plant, Environmental Sciences Division Publication No. 3256 (1989).

Li, Treatment of Chloro-hydrocarbon-contaminated Groundwater by an Integrated Method of Stripping, Adsorption, and Bioregeneration, Hazardous Materials Conference, 56 and 62, (Mar./Apr. 1990).

Tyndall, R. L. et al., Isolation of Amoebic-Bacterial Consortia Capable of Degrading Trichloroethylene, Twelfth Symposium on Biotechnology for Fuels and Chemicals, Gatlinburg, Tenn. (May 1990).

Vass, A. A., et al., Isolating Free Living Amoeba Can Select for Complex, Stable Consortia Capable of Degrading Toxins, ASM Internation Conference on Multicellular Behavior of Bacteria, Woods Hole, Mass., Abstract (Oct. 1990).

Alvarez-Cohen, L., et al., Two-Stage Dispersed-Growth Treatment of Halogenated Aliphatic Compounds by Cometabolism, Environmental Science & Technology, vol. 25, 1387–1393 (1991).

Alvarez-Cohen, L., et al., A Cometabolic Biotransformation Model for Halogenated Aliphatic Compounds Exhibiting Product Toxicity, Environmental Science & Technology, vol. 25, 1381–1387 (1991).

Strand S.E. Biodegradation of Chlorinated Solvents in a Sparged, Methanotrophic Biofilm Reactor, Research Journal WPCF, vol. 63, No. 6, 859–867 (Sep./Oct. 1991).

Wickramanayake, G. B. et al., Aerobic Biotreatment of Trichloroethylene-Contaminated Groundwater, 7th National Conference on Hazardous Wastes and Hazardous Materials, St. Louis, Mo., 359–362 (May 1990).

Tsien, H. C., Biodegradation of Trichloroethylene by *Methylosinus trichosporium* OB3b, Applied and Environmental Microbiology, vol. 55, No. 12, 3155–3161 (Dec. 1989).

Baek, N. H., et al., The Degradation of Trichloroethylene in Mixed Methanogenic Cultures, J. Environ. Qual., vol. 18, No. 4, 515–518 (1989).

Phelps, T. J., et al. Biodegradation of Mixed-Organic Wastes by Microbial Consortia in Continuous-Recycle Expanded-Bed Bioreactors, Environmental Science & Technology, vol. 25, 1461–1465 (1991).

Palumbo, A. V., et al., A Co-Metabolic Approach to Groundwater Remediation, 1991 Department of Energy Environmental Restoration Conference, Pasco, Wash. (Sep. 1991).

Leahy, M. C., et al., Biodegradation of Chlorinated Aliphatics by a Methanotrophic Consortium in a Biological Reactor, Biotreatment, 3–9 (1989).

Palumbo, A. V., et al., The Effects of Groundwater Chemistry on Cometabolism of Chlorinated Solvents by Methanotrophic Bacteria, 199th American Chemical Society National Meeting, Boston, Mass., 225–238 (Apr. 1990).

METHOD AND APPARATUS FOR DESTROYING ORGANIC CONTAMINANTS IN AQUEOUS LIQUIDS

This invention was made with Government support under Contract No. DE-AC05-84OR21400 awarded by the U.S. Department of Energy to Martin Marietta Energy Systems, Inc. and the Government has certain rights in this invention.

FIELD OF THE INVENTION

This invention relates to the destruction of organic contaminants in aqueous liquids, and more particularly to the destruction of chlorinated alkenes, such as trichloroethylene (TCE), in groundwater.

BACKGROUND OF THE INVENTION

Chlorinated alkenes, particularly TCE, were utilized in the past in a number of various chemical processes carried out by different industries. TCE was generally used for metal degreasing, solvent extraction, dry cleaning, fumigation, and as a chemical intermediate. TCE is a heavy, stable, toxic liquid with a chloroform aroma which is slightly soluble in water and soluble in most common organic solvents. TCE has a boiling point of 87° C. TCE has been recognized as a hazardous organic contaminant in various aqueous liquids, especially groundwater. Groundwater is generally defined as all subsurface water, especially that part that is in the zone of saturation. The zone of saturation is generally defined as a subsurface zone in which water fills the interstices and is under pressure greater than atmospheric pressure. The presence of TCE in groundwater can adversely affect its potability, as well as the cultivability of the surrounding soil.

Possible solutions to this problem have included several approaches, two of which are steam stripping and biodegradation. Steam stripping, also referred to as steam distillation, is a process in which vaporization of the volatile constituents of a liquid mixture, in this case chlorinated alkenes, takes place by introducing steam directly into the charge. Steam used in this manner is known as open steam. Biodegradation on the other hand, covers a variety of different processes whereby living organisms are employed to perform a biochemical transformation on a substrate such that the substrate is converted into a desirable intermediate or end product. What is needed is a method and apparatus for removing organic contaminants from groundwater by integrating steam stripping with biodegradation, thus overcoming several deficiencies that occur when either steam stripping or biodegradation is used alone.

Steam stripping of contaminated groundwater produces an effluent waste stream which contains the organic contaminants, which will require further treatment and disposal. The present invention provides for an efficient on-site treatment technology that will remove the organic contaminants and will not produce any further major waste streams.

Aerobic biodegradation of organic contaminants is impeded by iron and other minerals in groundwater that precipitate onto the biofilms and interfere with biodegradation. Previously, methods such as ion exchange and demineralization were used to remove minerals prior to biodegradation. However, these methods create a new hazardous waste stream which would require further treatment and disposal. The present invention excludes these minerals and other dissolved solids from the biodegradation portion of the process without the need for explicit removal and handling.

Biodegradation is a relatively slow process at the low concentration of organic contaminants typically found in groundwater. Previously, all the contaminated groundwater was fed directly to the bioreactor without the benefit of a concentration step. The present invention takes advantage of the natural concentration step in steam stripping to provide a more concentrated feed stream to the bioreactor, which leads to more efficient biodegradation kinetics. Additionally, this concentration step reduces the volume of water to be treated in the bioreactor, which in turn allows for a substantially smaller bioreactor column. Consequently, the net capacity of the bioreactor is increased by approximately 20 fold. For example, a flow of 100 gallons per minute (gpm) of groundwater can be treated by a bioreactor that handles only approximately 5 gpm. Also, the overhead condensate produced by the steam stripping is treated via biodegradation, a technology that produces no significant further waste streams when coupled to a steam stripper.

Finally, biodegradation is relatively inefficient in producing the very low effluent concentration of organic contaminants necessary for discharge of the treated water back to the environment. Previously, the bioreactor effluent had to undergo further treatment prior to discharge to the environment. The present invention provides for the recycle of the bioreactor effluent back to the steam stripper, such that it is not necessary to achieve a high quality effluent from the bioreactor.

OBJECTS OF THE INVENTION

Accordingly, it is an object of the present invention to provide a new and improved method for destroying organic contaminants in aqueous liquids.

It is another object of the present invention to provide a new and improved method for reducing the cost of destroying organic contaminants in aqueous liquids.

It is another object of the present invention to provide a new and improved method for restoring the potability of groundwater containing organic contaminants.

It is another object of the present invention to provide a new and improved method for restoring the cultivability of soil surrounding groundwater containing organic contaminants.

It is another object of the present invention to provide a new and improved apparatus for destroying organic contaminants in aqueous liquids.

Further and other objects of the present invention will become apparent from the description contained herein.

SUMMARY OF THE INVENTION

In accordance with one aspect of the present invention, the foregoing and other objects are achieved by:
introducing the aqueous liquid into a steam stripper, the aqueous liquid being comprised of water and an organic contaminant, the steam stripper having at least one fluid inlet and at least one fluid outlet;
volatilizing a portion of the water and essentially all of the organic contaminant to form a vapor stream and a water stream, the vapor stream being comprised of water vapor and organic contaminant vapor, the water stream being comprised of water;

discharging the water stream from the stream stripper;

condensing the vapor stream to form a condensate;

introducing the condensate into a bioreactor, the bioreactor containing a biocatalyst;

reacting the biocatalyst with the organic contaminant to form an end product and a bioreactor effluent;

circulating the bioreactor effluent back to the steam stripper.

In accordance with another aspect of the present invention, the foregoing and other objects are achieved by:

a steam stripper, the steam stripper having at least one fluid inlet and at least one fluid outlet;

first introducing means for introducing the aqueous liquid into the steam stripper, the aqueous liquid being comprised of water and an organic contaminant; the first introducing means being in fluid communication with the steam stripper;

volatilizing means for volatilizing a portion of the water and essentially all of the organic contaminant to form a vapor stream and a water stream, the vapor stream being comprised of water vapor and organic contaminant vapor, the water stream being comprised of water, the volatilizing means being in fluid communication with the steam stripper;

discharging means for discharging the water stream from the steam stripper, the discharging means being in fluid communication with the steam stripper;

condensing means to condense the vapor stream to a condensate, the condensing means being in fluid communication with the steam stripper;

second introducing means for introducing the condensate into a bioreactor, the bioreactor containing a biocatalyst, the second introducing means being in fluid communication with the bioreactor and the condensing means, the biocatalyst reacting with the organic contaminant to produce an end product and a bioreactor effluent stream; and circulating means for circulating the bioreactor effluent stream back to the steam stripper, the circulating means being in fluid communication with the bioreactor and the first introducing means.

DETAILED DESCRIPTION OF THE PREFERRED EMBODIMENT

Figure 1:
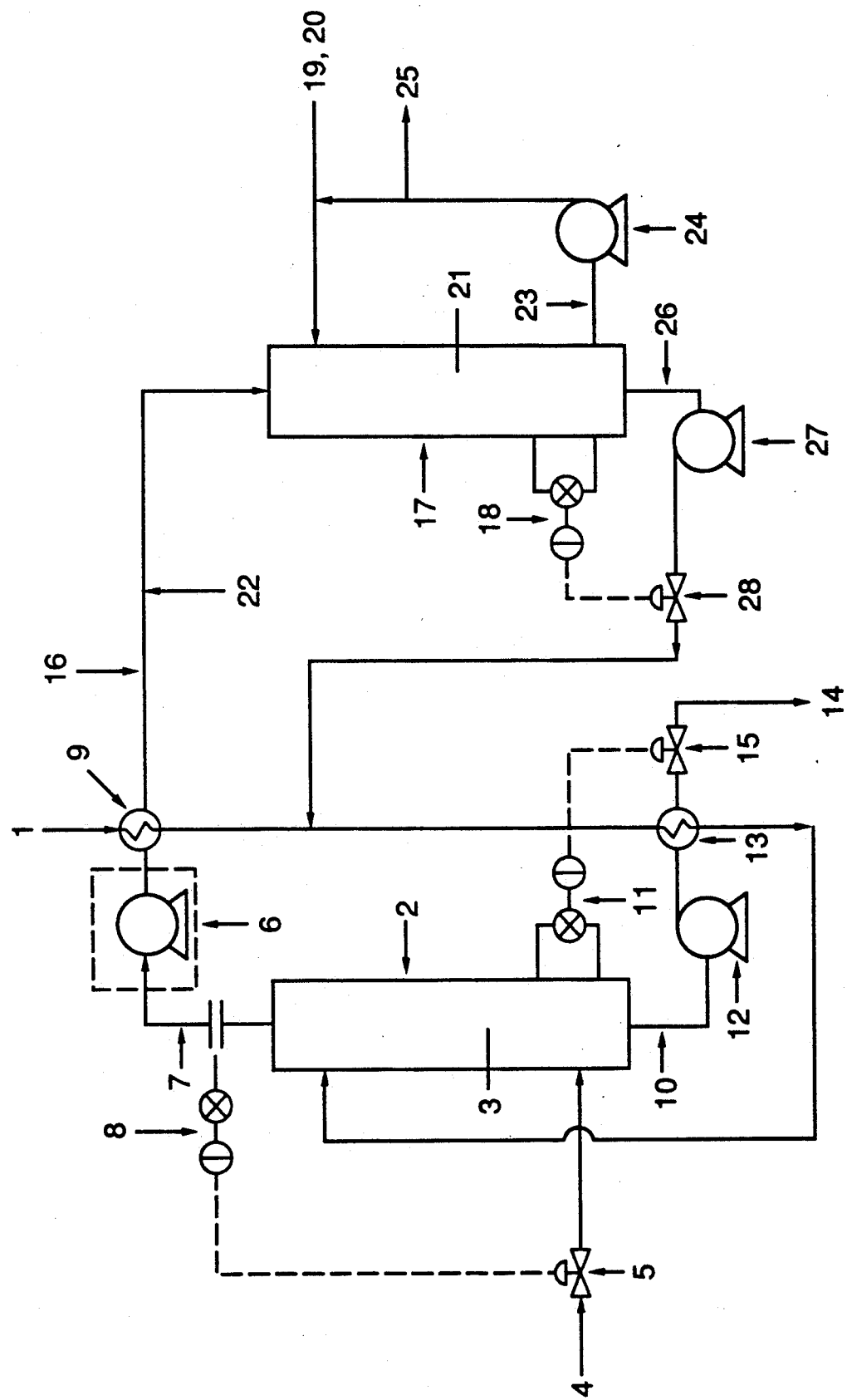
FIG. 1 is a schematic diagram of the major processing steps involved with the removal of organic contaminants from aqueous liquids, in accordance with the present invention.

With reference to FIG. 1, the contaminated aqueous liquid 1 is fed to the top of the steam stripper 2. The steam stripper 2 has at least one fluid inlet and at least one fluid outlet. The contaminated aqueous liquid 1 is a mixture of water and at least one type of chlorinated alkene. The steam stripper 2 is a column filled with solid packing material 3 to create a large surface area of water as the contaminated aqueous liquid 1 flows downwardly over the packing material 3. The steam stripper 2 is designed according to the liquid feed rate and vapor/liquid ratio. Steam 4 is then directly introduced into the steam stripper 2 in order to provide energy for the volatilization of essentially all of the chlorinated alkene and a portion of the water. The steam 4 can be generated by any number of devices, included but not limited to, gas fired or electric steam furnaces. The typical steam pressure would be in the range of about 50 to about 150 pounds per square inch (psi). The typical steam temperature would be in the range of about 300° to about 370° F. The flow of steam 4 can be controlled by a control valve 5. If desired, the steam stripper 2 can be operated under vacuum to help reduce the boiling temperature of the water and minimize the energy input requirements. This can be accomplished by the use of a vacuum blower 6. The vacuum blower 6 is designed to provide the desired vacuum at the designed vapor flow rate. The liquid level of the steam stripper 2 can be monitored by a liquid level indicator 11 which in fluid communication with the steam stripper 2. As a result of the volatilization, a vapor stream 7 is formed containing water vapor and chlorinated alkene vapor. The vapor stream 7 can be monitored with a flow rate indicator 8. The vapor stream 7 exits the top of the stream stripper 2 where it then passes to a condenser 9, wherein the vapor stream 7 is converted back to the liquid phase to form a condensate 16. The condenser 9 may also act as a heat exchanger, preheating the contaminated aqueous liquid 1 before it is introduced into the steam stripper 2. The majority of the water contained in the contaminated aqueous liquid 1 exits the bottom of the steam stripper 2 in the form of a water stream 10. The water stream 10 contains all of the minerals which are normally found in groundwater. As a consequence, the condensate 16 does not contain any minerals which would interfere with subsequent biodegradation. The water stream 10 is then transported by a pump 12 to a heat exchanger 13, wherein the heat of the water stream 10 may be transferred to the incoming contaminated liquid 1 to act as a preheater. As a result, the contaminated aqueous liquid 1 can be preheated twice before it is introduced into the steam stripper 2, thus reducing the energy input requirements to convert the liquid phase to the vapor phase. Once the water stream 10 passes through the heat exchanger 13, it can then be released back into the enviroment as treated water 14. The flow of the treated water 14 can be controlled by a control valve 15.

Figure 2:
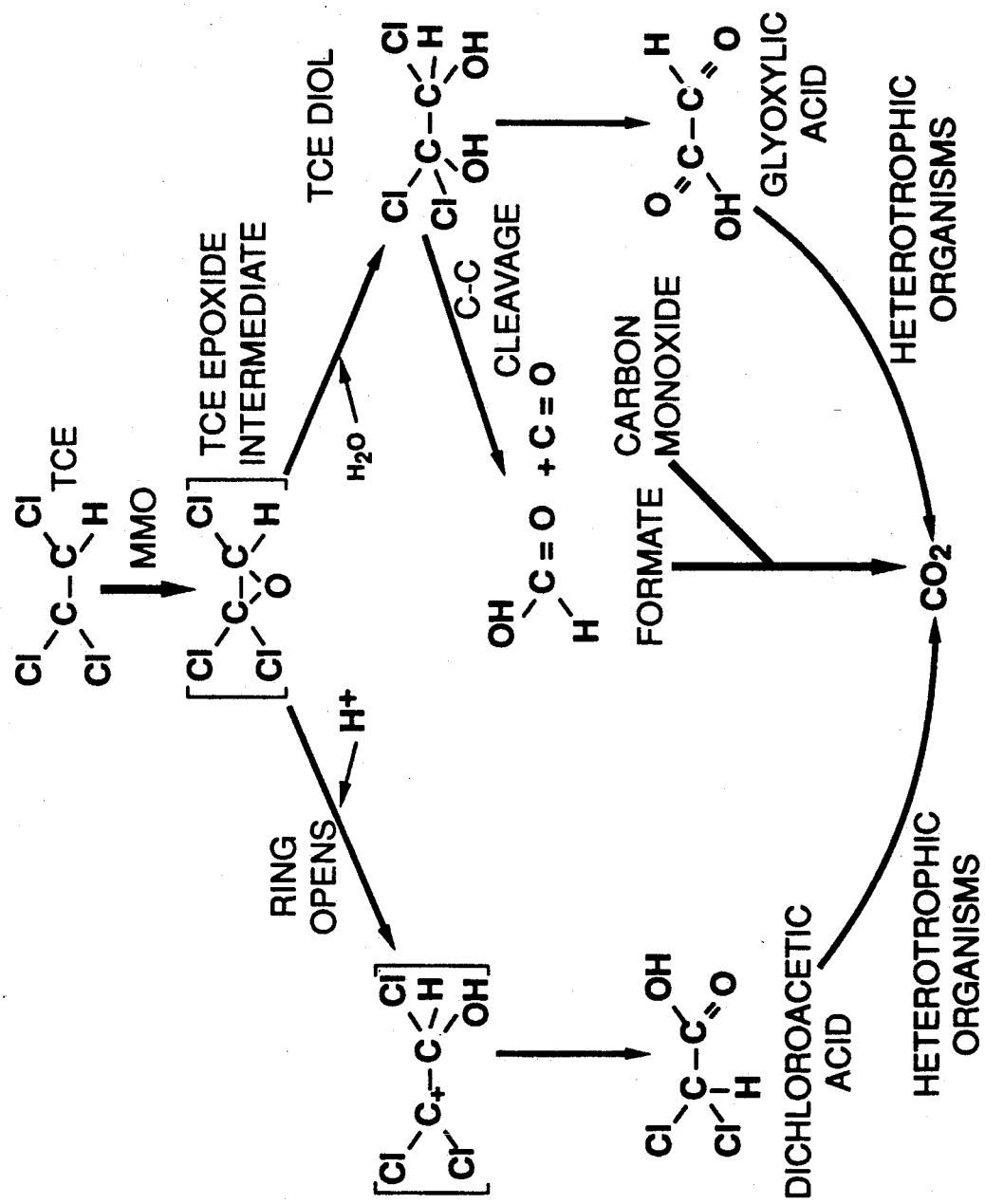
FIG. 2 is a flow diagram illustrating the major biochemical steps involved with the conversion of TCE to carbon dioxide.

The condensate 16 formed from the steam stripper 2 is then introduced into a bioreactor 17, which contains biocatalysts, in this case methanotrophic microorganisms 21. The bioreactor 17 generally has operating parameters of a temperature in the range of about 20° to about 35° C. and a pH of about 7. The liquid level of the bioreactor 17 can be monitored by a liquid level indicator 18 which is in fluid communication with the bioreactor 17. In the case of contaminants such as chlorinated alkenes, methane 19 and air 20 are fed to the bioreactor 17 to support the biocatalysts, in this case methanotrophic microorganisms 21 that convert the chlorinated alkenes into mainly carbon dioxide, along with water and hydrochloric acid, via cometabolism. Cometabolism is generally defined as the simultaneous biotransformation of a primary energy source, such as methane, and a secondary chemical species, such as chlorinated alkenes. Trace quantities of nutrients 22, such as nitrogen and phosphorous, are also added to the bioreactor 17 to support the methanotrophic microorganisms 21. Methanotrophic microorganisms 21 are generally defined as those microorganisms which can derive energy from the utilization of methane 19, specifically by oxidation. The methanotrophic microorganisms 21 can be comprised of either a single bacterial species or a consortia of several bacterial species, and/or other microorganisms. The presence of various different microorganisms in a single culture is generally referred to as a mixed culture. The methanotrophic microorganisms 21 can cometabilize short-chain chlorinated hydrocarbons, such as chlorinated alkenes. The chlorinated alkenes are acted upon by the enzyme methane monooxygenase which oxidizes them into epoxides. The epoxides then spontaneously hydrolyze to intermediates that can be further metabolized. FIG. 2 illustrates the biochemical steps involved with the conversion of TCE to carbon dioxide. A complete description of this technology is found in Little et al., "Trichloroethylene Biodegradation by a Methane-Oxidizing Bacterium", *Applied and Environmental Microbiology* 54(4): 951-956 (1988), Standberg, et al., "Degradation of Trichloroethylene and trans-1,2-Dichloroethylene by a Methanotrophic Consortium in a Fixed-Film, Packed-Bed Bioreactor", *Environ. Sci. Technol.* 23(11): 1422-1425 (1989), Garland et al., "The Use of Methanotrophic Bacteria for the Treatment of Groundwater Contaminated with Trichloroethane at the U.S. Department of Energy Kansas City Plant", *Environmental Sciences Division Publication No.* 3256 (1989), Tyndall et al., "Isolation of Amoebic-Bacterial Consortia Capable of Degrading Trichloroethylene", *Twelfth Symposium on Biotechnology for Fuels and Chemicals* Gatlinburg, Tenn. (1989), Vass et al., "Isolating Free Living Amoeba Can Select for Complex, Stable Consortia Capable of Degrading Toxins", *ASM International Conference on Multicellular Behavior of Bacteria* Woods Hole, Mass. (1990), Tsien et al., "Biodegradation of Trichloroethylene by Methylosinus trichosporium OB3b", *Applied and Environmental Microbiology* 55(12): 3155-3161 (1989), Baek et al., "The Degradation of Trichloroethylene in Mixed Methanogenic Cultures", *J. Environ. Qual.* 18(4): 515-518 (1989), Leahy et al., "Biodegradation of Chlorinated Aliphatics by a Methanotrophic Consortium in a Biological Reactor", *Biotreatment* 3-9 (1989), Palumbo et al., "The Effects of Groundwater Chemistry on Cometabolism of Chlorinated Solvents by Methanotrophic Bacteria", *199th ACS National Meeting* Apr. 22-27, 1990 (Boston, Mass.) 225-238 (1990), Wickramanayake et al., Aerobic Biotreatment of Trichloroethylene-Contaminated Groundwater", *Proceedings of the 7th National Conference on Hazardous Wastes and Hazardous Materials* May 2-4, 1990 (St. Louis, Mo.) 359-362, 1990, Alvarez-Cohen et al., "Two-Stage Dispersed-Growth Treatment of Halogenated Aliphatic Compounds by Cometabolism", *Environ. Sci. Technol.* 25(8): 1381-1392 (1991), Strand et al., "Biodegradation of Chlorinated Solvents in a Sparged, Methanotrophic Biofilm Reactor", *Research Journal WPCF* 63(6): 859-867 (1991), Phelps et al., "Biodegradation of Mixed-Organic Wastes by Microbial Consortia in Continuous-Recycle Expanded-Bed Bioreactors", *Environ. Sci. Technol.* 25(8): 1461-1465 (1991), Palumbo et al., "A Co-Metabolic Approach to Groundwater Remediation", *Environmental Remediation '91* Sep. 8-11, 1991 (Pasco, Wash.), 95-100 (1991), the entire disclosures of which are incorporated by reference.

A small off-gas stream 23 is produced as a result of the biochemical reactions occurring in the bioreactor 17. The off-gas stream 23 contains methane, air, carbon dioxide and trace levels of unconverted organic contaminants. The off-gas stream 23 can be recycled back to the bioreactor 17 for further processing with the use of a pump 24. A small purge stream 25 is required to eliminate certain inert materials such as nitrogen and carbon dioxide. A bioreactor effluent stream 26 is produced as a result of the biochemical reactions occurring in the bioreactor 17, which is then circulated back to the steam stripper 2 for further processing. A pump 27 is used to transport the bioreactor effluent stream 26 back to the stream stripper 2. The flow of the bioreator effluent stream 26 can be controlled by a control valve 28. Thus, the only effluents from the present invention are the treated water 14 and the small purge stream 25. A key feature of the present invention is the capability to recycle the bioreactor effluent stream 26 from the bioreactor 17 to the steam stripper 2. This minimizes the number of waste streams that are produced which would necessitate further handling and disposal. Implementation of this feature may be attractive for other treatment technologies such as air stripping, carbon adsorption, and UV-ozone in various process configurations. An example of the integrated process of steam stripping with biodegradation to destroy organic contaminants in aqueous liquids in accordance with the present invention is presented below:

EXAMPLE I

Groundwater containing 1 part per million (ppm) of trichloroethylene (TCE) is pumped at 100 gallons per minute (gpm) to the steam stripper. In the stripper, 99.5% of the total TCE introduced into the steam stripper is removed overhead to produce a treated effluent water. To achieve this removal efficiency of TCE in the steam stripper, 5% of the water is vaporized to produce an overhead stream at 5 gpm. This overhead stream is condensed to a liquid and fed to the bioreactor, where 95% of the TCE fed to the steam stripper is biodegraded to carbon dioxide. The liquid effluent from the bioreactor at 5 gpm contains some unreacted TCE, and is returned to the steam stripper. Under these operating conditions, the overhead stream fropm the steam stripper contains 21 ppm of TCE, the liquid effluent from the bioreactor contains 1.05 ppm of TCE, and the treated effluent water from the steam stripper contains 5.26 parts per billion (ppb) of TCE. Thus, the overall conversion efficiency for TCE is essentially equal to the steam stripper efficiency.

The advantages of the integrated process of the present invention are also applicable to the treatment of other hazardous organic chemicals under both aerobic and anaerobic conditions. Additionally, it should be recognized that although the present invention is directed primarily towards the removal of organic contaminants from groundwater, it can be practiced on many aqueous liquids, regardless of the source. It is also conceivable that the present system, with minor modifications, may be utilized for destroying organic contaminants in organic liquids. That system would most likely employ some sort of distillation system based upon the different boiling points of the various chemical species involved.

While there have been shown and described what are at present considered the preferred embodiments of the invention, it will be obvious to those skilled in the art that various changes and modifications can be made therein without departing from the scope of the invention defined by the appended claims.

What is claimed is:

1. A method for destroying organic contaminants in an aqueous liquid,
    comprising the steps of:
    introducing the aqueous liquid into a steam stripper, the aqueous liquid being comprised of water and an organic contaminant, the steam stripper having at least one fluid inlet and at least one fluid outlet;
    volatilizing a portion of the water and essentially all of the organic contaminant to form a vapor stream and a water stream, the vapor stream being comprised of water vapor and organic contaminant vapor, the water stream being comprised of water;
    discharging the water stream from the steam stripper;
    condensing the vapor stream to form a condensate;
    introducing the condensate into a bioreactor, the bioreactor containing a biocatalyst;
    reacting the biocatalyst with the organic contaminant to form an end product and a bioreactor effluent;
    circulating the bioreactor effluent back to the steam stripper.

2. A method in accordance with claim 1, wherein the step of reacting the biocatalyst with the organic contaminant further produces an off-gas stream, the off-gas stream containing methane, air, carbon dioxide, and an organic contaminant.

3. A method in accordance with claim 2, further comprising the step of circulating the off-gas stream back to the bioreactor.

4. A method in accordance with claim 1, wherein the step of reacting the biocatalyst with the organic contaminant further produces a purge stream, the purge stream containing nitrogen and carbon dioxide.

5. A method in accordance with claim 1, wherein the aqueous liquid further comprises groundwater.

6. A method in accordance with claim 1, wherein the organic contaminant is at least one type of chlorinated alkene.

7. A method in accordance with claim 6, wherein the chlorinated alkene is trichloroethylene.

8. A method in accordance with claim 1, wherein the steam stripper is operated under a vacuum.

9. A method in accordance with claim 1, wherein the step of condensing the vapor stream further comprises passing the vapor stream through a condenser, the step of passing the vapor stream though the condenser resulting in the transfer of heat from the vapor stream to the aqueous liquid prior to introduction into the stream stripper.

10. A method in accordance with claim 1, wherein the step of discharging the water stream further comprises passing the water stream through a heat exchanger, the step of passing the water stream through the heat exchanger resulting in the transfer of heat to the aqueous liquid prior to introduction into the steam stripper.

11. A method in accordance with claim 1, wherein the step of reacting the biocatalyst with the organic contaminant further comprises introducing methane and air into the bioreactor.

12. A method in accordance with claim 1, wherein the step of reacting the biocatalyst with the organic contaminant further comprises introducing nitrogen and phosphorous into the bioreactor.

13. A method in accordance with claim 1, wherein the end product is carbon dioxide.

14. A method in accordance with claim 1, wherein the biocatalyst is at least one type of microorganism.

15. A method in accordance with claim 14, wherein the microorganism is methanotrophic.

16. A method in accordance with claim 14, wherein the microorganism is at least one type of bacterium.

17. A method in accordance with claim 16, wherein the bacterium is methanotrophic.

18. A method in accordance with claim 1, wherein the steam has a temperature in the range of about 300° to about 375° C.

19. A method in accordance with claim 1, wherein the steam has a pressure in the range of about 50 to about 150 pounds per square inch.

20. An apparatus for destroying organic contaminants in an aqueous liquid, comprising:
    a steam stripper, the steam stripper having at least one fluid inlet and at least one fluid outlet;
    first introducing means for introducing the aqueous liquid into the steam stripper, the aqueous liquid being comprised of water and an organic contaminant; the first introducing means being in fluid communication with the steam stripper;
    volatilizing means for generation of steam for volatilizing a portion of the water and essentially all of the organic contaminant to form a vapor stream and a water stream, the vapor stream being comprised of water vapor and organic contaminant vapor, the water stream being comprised of water, the volatilizing means being in fluid communication with the steam stripper;
    discharging means for discharging the water stream from the steam stripper, the discharging means being in fluid communication with the steam stripper;
    condensing means to condense the vapor stream to a condensate, the condensing means being in fluid communication with the steam stripper;
    second introducing means for introducing the condensate into a bioreactor, the bioreactor containing a biocatalyst, the second introducing means being in fluid communication with the bioreactor and the condensing means, the biocatalyst reacting with the organic contaminant to produce an end product and a bioreactor effluent stream; and
    circulating means for circulating the bioreactor effluent stream back to the steam stripper, the circulating means being in fluid communication with the bioreactor and the first introducing means.

* * * * *